(12) United States Patent
Feil

(10) Patent No.: US 9,274,331 B2
(45) Date of Patent: Mar. 1, 2016

(54) ELECTROWETTING OPTICAL ELEMENT

(75) Inventor: Hermanus Feil, Valkenswaard (NL)

(73) Assignee: Miortech Holding B.V., Eindhoven (NL)

(*) Notice: Subject to any disclaimer, the term of this patent is extended or adjusted under 35 U.S.C. 154(b) by 20 days.

(21) Appl. No.: 13/881,555

(22) PCT Filed: Oct. 18, 2011

(86) PCT No.: PCT/EP2011/068153
§ 371 (c)(1),
(2), (4) Date: Jul. 3, 2013

(87) PCT Pub. No.: WO2012/055724
PCT Pub. Date: May 3, 2012

(65) Prior Publication Data
US 2013/0278994 A1 Oct. 24, 2013

(30) Foreign Application Priority Data
Oct. 29, 2010 (EP) .................. PCT/EP2010/066445

(51) Int. Cl.
G02B 26/00 (2006.01)
G02B 26/08 (2006.01)
G02F 1/29 (2006.01)

(52) U.S. Cl.
CPC ......... *G02B 26/005* (2013.01); *Y10T 29/49204* (2015.01)

(58) Field of Classification Search
USPC ......... 359/237, 242, 246, 247, 290–292, 295, 359/296, 298
See application file for complete search history.

(56) References Cited

U.S. PATENT DOCUMENTS

2009/0169806 A1* 7/2009 Lo et al. .................. 428/119

FOREIGN PATENT DOCUMENTS

EP   2108995       10/2009
NL   2010/062163   * 3/2010 ............ G02B 26/02

OTHER PUBLICATIONS

Int'l Search Report and Written Opinion issued in app. No. PCT/EP2011/06813 (2011).

* cited by examiner

*Primary Examiner* — Joseph P Martinez
*Assistant Examiner* — Brandi Thomas
(74) *Attorney, Agent, or Firm* — Mark J. Nahnsen; Barnes & Thornburg LLP

(57) ABSTRACT

An electrowetting optical element comprising a first electrode layer stack and a second electrode layer stack, and a containment space formed between said first electrode layer stack and said second electrode layer stack, one or more pixel walls fixedly mounted on said second interface surface and extending between said first and second electrode stacks, for defining sides of said containment space. Said containment space at least contains a polar liquid and a non-polar liquid, the polar and non-polar liquids being immiscible with each other. Said hydrophobic interface surface has a higher hydrophobicity than the second interface surface. The electrowetting element is arranged for enabling powering of said first and second electrode layers for rearranging said polar liquid relative to said non-polar liquid. An end face of said one or more pixel walls opposite said first electrode layer stack faces said hydrophobic interface surface in a loose manner.

3 Claims, 3 Drawing Sheets

ELECTROWETTING OPTICAL ELEMENT

CROSS REFERENCE TO RELATED APPLICATIONS

This application is a U.S. nationalization under 35 U.S.C. § 371 of International Application No. PCT/EP2011/068153, filed Oct. 18, 2011, which claims priority to International Patent Application No. PCT/EP2010/066445, filed Oct. 29, 2010. The disclosures set forth in the referenced applications are incorporated herein by reference in their entireties.

FIELD OF THE INVENTION

The present invention relates to an electrowetting optical element, a display comprising electrowetting optical elements and a method of manufacturing an electrowetting optical element.

BACKGROUND

Electrowetting technology is based on modification of an energy balance between on one hand surface tension forces of liquids and wetting properties of a solid surface, and on the other hand electrostatic forces induced by an applied voltage over a capacitor arrangement comprising said boundary layer.

An electrowetting optical element or cell, further referred to as electrowetting element, according to the state of the art may from bottom to top be comprised of respectively a first electrode layer stack comprising a substrate, a first electrode layer, an electrically insulating hydrophobic layer or an insulating layer having a hydrophobic surface on a side opposite to the first electrode layer, for interfacing to a polar liquid and a non-polar liquid immiscible with each other, and a second electrode layer stack, comprising a second electrode which is electrically in contact with the polar liquid and a superstrate for supporting the second electrode layer. The second electrode layer has a hydrophobicity that is lower than the hydrophobic interface surface of the first electrode layer stack. This causes the non-polar liquid to be present near the hydrophobic surface of the first electrode stack and the polar liquid to be present near the less hydrophobic interface surface of the second electrode stack. Pixel walls attached to the first electrode layer stack and extending from the first electrode layer stack towards the second electrode layer stack, form a containment space between the first and second electrode stacks and the pixel walls. The pixel walls thus form a barrier for the non-polar liquid between the electrowetting cell and adjacent electrowetting cells.

An electrowetting element can thus form a picture element or pixel. A plurality of electrically controlled electrowetting elements can together form a display or part thereof comprising pixels, which can be used for displaying arbitrary images by appropriately controlling the electrowetting elements forming the display. Electrowetting elements can have arbitrary shapes determined by the shape of the pixel walls, such that displays can be manufactured for specific purposes.

An electrowetting element is mainly transparent, except for the non-polar liquid in each of the pixels formed by the pixel walls. The non-polar liquid is often non-transparent or has a low optical transmission coefficient. The transmission coefficient of the non-polar liquid typically depends on the application of the electrowetting element. In a colour display, an electrowetting element comprising coloured non-polar liquids may be used.

Electrowetting elements can be applied in a transmissive implementation, using for example backlighting to light-up the display screen. In another implementation the electrowetting elements may be applied in a reflective set-up, for example by providing a (specular or diffuse) reflective surface at one of the electrode layers.

The principles of operation of an electrowetting element are as follows. In an unpowered state, i.e. when no voltage is applied over the first and second electrode, the lowest energetic state of the system is where the non-polar liquid forms a boundary layer between the polar liquid and the hydrophobic surface of the insulating layer. This is because the polar liquid is repelled by the hydrophobic layer. The poor transmissibility of the non-polar liquid then forms an obstruction to light that penetrates the system.

When a voltage is applied over the electrodes, the lowest energetic state of the system becomes the situation wherein the (poorly conductive or insulating) non-polar liquid is pushed aside by the (conductive) polar liquid, and the polar liquid thereby being in direct contact with the insulating hydrophobic layer. Note that the voltage must be large enough for the electrostatic forces to overcome the repellent and surface tension forces that separate the polar liquid from the hydrophobic surface. In this situation, light that penetrates the system has rather unobstructed access to the insulating hydrophobic layer because of the well transmissibility of the polar liquid and the non-polar liquid being pushed aside. In the powered up state, when voltage is applied over the electrodes, the electrowetting element is thus transmissive. This working principle is used in electrowetting type displays and screens.

Electrowetting elements according to the state of the art exhibit poor adhesion of the pixel wall to the hydrophobic surface, causing the pixel walls to deteriorate, thereby destroying the electrowetting element and it's surrounding electrowetting elements which are defined by the pixel walls. This is due to the fact that the hydrophobic surface has a very low contact angle hysteresis and low surface tension which makes it extremely difficult to apply an uniform coating of photoresist from which the pixel walls are formed. Furthermore the adhesion of the photoresist to the hydrophobic surface is very poor, thus resulting in poor adhesion and deterioration of the pixel walls. This problem may already occur during manufacturing of the electrowetting elements, when pixel walls are created. As a result, the yield of commercial manufacturing processes is lowered and in addition the technical life of electrowetting displays is shortened.

In the art, adhesion of the pixel walls can be improved by performing a surface modification of the hydrophobic surface for making this surface less hydrophobic. After manufacturing of the pixels walls the surface is returned to a hydrophobic state by an annealing step. However the return to a hydrophobic state with minimal contact angle hysteresis is often not perfect causing imperfect spreading of the oil after switching to the unpowered state. Such a method thus leads to problems with the opening and closing of the pixels during switching operation.

SUMMARY OF THE INVENTION

The present invention has for its object to obviate the above mentioned problems and disadvantages of the prior art, and to provide an electrowetting optical element having an improved structural integrity and switching behavior.

In accordance with an aspect of the invention the above mentioned object is achieved by an electrowetting optical element comprising a first electrode layer stack and a second electrode layer stack, and a containment space formed between said first electrode layer stack and said second electrode layer stack, one or more pixel walls extending between said first and second electrode stacks, for defining sides of said containment space, said containment space at least containing a polar liquid and a non-polar liquid, the polar and non-polar liquids being immiscible with each other.

Said first electrode layer stack comprises a substrate, a first electrode layer and an insulating layer having a hydrophobic interface surface with said containment space, and said second electrode layer stack comprises a superstrate and a second electrode layer having a second interface surface with said containment space. Said hydrophobic interface surface has a higher hydrophobicity than the second interface surface.

The electrowetting element is arranged for enabling powering of said first and second electrode layers for rearranging said polar liquid relative to said non-polar liquid.

The pixel walls are fixedly mounted on said second interface surface of said second electrode layer stack and extend towards said first electrode layer, wherein an end face of said one or more pixel walls opposite said first electrode layer stack faces said hydrophobic interface surface in a loose manner.

The wording 'in a loose manner' indicates that no fixation or structural attachment is achieved of the end face of the pixel walls with the hydrophobic interface of the first electrode layer stack. This end face may be, but is not necessarily, contiguous to the hydrophobic surface of the first electrode layer stack. An advantage of this embodiment is that it can be easily created in a manufacturing process since no structural attachment is required between the pixel walls and the first electrode layer stack.

Since the pixel walls are created on the less hydrophobic second interface surface of the second electrode layer, their height is such that the pixel walls extend from the second electrode layer stack sufficiently far to the first electrode layer stack in order to prevent spreading of the non-polar liquid from pixel to pixel and containing the non-polar liquid within each pixel. This can be done without deteriorating the structural integrity of the pixel walls, simply because the connection between the pixel walls and the less hydrophobic second interface surface is mechanically stronger than a connection between the pixel walls and the hydrophobic interface surface as in the prior art. Thus the structural integrity of the end product is improved.

Pixel walls having a height such that they span the full distance between the second and first electrode layer have an advantage that they function as spacers keeping the first and second electrode layer at the desired distance. This also improves the optical and structural properties of the electrowetting element.

By the terms 'hydrophobic interface surface', and 'less hydophobic second interface surface' it is meant that the respective surfaces of the first and second electrode layer stacks are such that their interfaces with the containment space are hydrophobic and less hydrophobic or hydrophilic respectively.

Usually, the polar liquid will be water, or a substance that is based primarily on water, since water is readily available and consist of molecules having a structure as such they form an electrical dipole. However, the skilled person will appreciate that other polar liquids may also be suitable for use in an electrowetting element. Moreover, the non-polar liquid will often be an oily substance with a suitable colour and suitable optical properties. However, the non-polar liquid may be formed by any suitable substance that can be used in an electrowetting optical element, immiscible with the polar liquid and not containing molecules having a non-zero chemical polarity.

According to an embodiment according to the invention, a slit is present in between the end face and the hydrophobic interface for entrainment of the non-polar liquid into the slit. This improves the operational behaviour of the electrowetting element, since upon switching the electrowetting element in a powered up state the non-polar liquid will retract from the hydrophobic surface into a low energetic state. Moreover, the small capillary surface that is formed on one edge of the pixel wall near the hydrophobic surface of the first electrode in the powered up state, as a result of the non-polar liquid being entrained in the slit, reduces the amount of light scattering and thus improves the optical properties of the electrowetting element. In this embodiment, the height of the pixel walls is thus slightly smaller than the distance between the first and second electrode layer, for forming the slit.

The optical properties of the electrowetting element can also be improved by a further embodiment wherein the pixel walls comprise a hydrophobic surface. In that case, the polar liquid will be repelled by the pixel walls, such that energetically the non-polar liquid will more likely stay near the pixel walls. In a powered up state, with this embodiment, the capillary surface mentioned herein above at one edge of the slit between the pixel wall and the hydrophobic surface, will be larger since the non-polar liquid (oil) will tend to 'crawl up' the pixel wall. The amount of light scattering in this embodiment is further reduced.

In a further embodiment according to the invention, the hydrophobic surface of the pixel walls is formed on the end face of the pixel walls opposite said first electrode layer. This allows the non-polar liquid which is attracted by both the hydrophobic surface and the hydrophobic first surface in the powered up state of the electrowetting cell to be entrained into the slit more easily.

According to a second aspect of the present invention, there is provided an electrowetting display comprising one or more electrowetting elements as described above. By appropriately controlling, said electrowetting elements can advantageously be operated, combined to form a display for displaying arbitrary images or shapes for various purposes.

According to a third aspect of the present invention, there is provided a method of manufacturing an electrowetting optical element comprising providing a second electrode layer stack comprising a superstrate and a second electrode layer having a second interface surface, fixedly mounting pixel walls on said second interface surface of said second electrode layer stack, thereby forming a containment space defined at least by said second interface surface and said pixel walls, filling said containment space with a polar liquid and a non-polar liquid, which polar liquid and non-polar liquid are immiscible with each other, end covering said containment space with a first electrode layer stack comprising a substrate, a first electrode layer and an insulating layer having a hydrophobic interface surface. The hydrophobicity of said hydrophobic interface surface is higher than the hydrophobicity of the second interface surface. An end face of said pixel walls faces said hydrophobic interface surface of said first electrode layer stack in a loose manner.

An advantage of the method of the present invention is that the method of manufacturing can be performed straightforwardly, since the array of containment spaces formed on the second electrode layer on which the pixel walls are fixedly mounted can be more easily filled with first the polar liquid to a desired level and the non-polar liquid subsequently, than an electrowetting element according to the prior art. Moreover, since the structural integrity of the mounting of the pixel walls on the second electrode surface is much better than in a method according to the prior art, the present method of manufacturing provides a higher yield of fully functioning electrowetting elements than in the method according to the prior art.

In an embodiment, the method step of covering said containment space is performed such that a slit is formed between said end face and said hydrophobic interface surface. This allows easy entrainment of the non-polar liquid, since this liquid is also attracted into the slit by capillary action of the hydrophobic interface surface of the first electrode layer stack and the end face of the pixel walls.

In a particular embodiment, the method further comprises a step of making the pixel walls hydrophobic, allowing the non-polar liquid to crawl up the pixel walls.

In respect of the above, it is to be noted that the degree as to which the pixel walls possess hydrophobic/hydrophilic properties may be optimised in order to prevent the non-polar liquid from adhering to the pixel walls when the pixel walls are too much hydrophobic (thereby hindering the switchability of the electrowetting element).

In a further embodiment, only the end face of the pixel walls opposite said hydrophobic interface surface of said first electrode layer stack is provided with a hydrophobic interface surface. This counteracts the adhesion of the non-polar liquid to sides of the pixel walls and allows the non-polar liquid to be more easily entrained into said slit.

In another embodiment the step of filling said containment space comprises filling said containment space with said polar liquid to an upper edge of said pixel walls or above said edge and evaporating said polar liquid such as to yield all of said containment space being filled to a predetermined level, further comprising a step of filling a remainder of said containment space with said non-polar liquid. The upper edge can coincide with the pixel wall end face. This enables filling the electrowetting element without the need to monitor the level of the polar liquid during the filling. While evaporating the polar liquid, the level will be monitored. When the correct level is reached, the non-polar liquid is supplied to the remainder of the containment space.

BRIEF DESCRIPTION OF THE DRAWINGS

The invention will further be described with reference to the enclosed drawings wherein embodiments of the invention are illustrated, and wherein.

DETAILED DESCRIPTION

Figure 1:
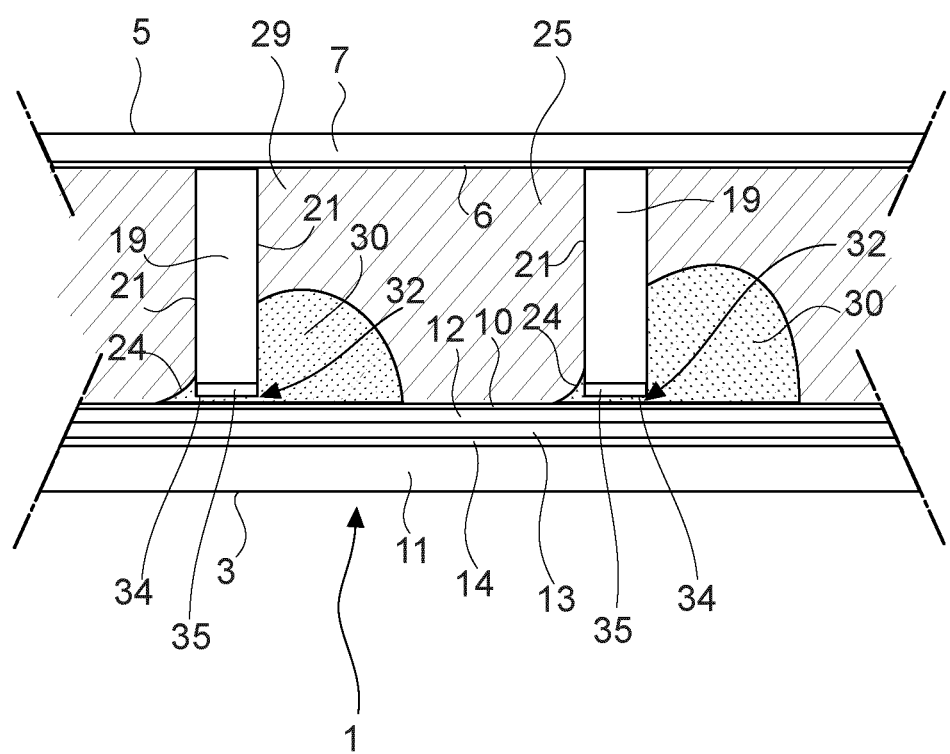
FIG. 1 illustrates an electrowetting optical element in accordance with the invention.

In FIG. 1, an electrowetting optical element or electrowetting element generally indicated with reference numeral 1, and situated between adjacent electrowetting elements, is illustrated. In the electrowetting element 1, a containment space 25 is present between a first electrode layer stack 3 and a second electrode layer stack 5. The first electrode layer stack 3 comprises a substrate 11, an insulating layer 12, a first electrode layer 13 and an optional reflective layer 14 that will be described below. The first electrode layer stack 3 is formed of an electrically conducting material such as indium tin oxide (ITO) and has a hydrophobic interface surface 10 forming the interface with the containment space 25. The hydrophobic interface surface 10 can be formed by a layer of a suitable fluoropolymer, such as CYTOPtm or AF1600tm.

The second electrode layer stack 5 comprises a superstrate 7 and a second electrode layer 6 supported by the superstrate 7. The second electrode layer 6 is in contact with the polar liquid 29, the second electrode layer 6 having a less hydrophobic or hydrophilic interface surface. The second electrode layer 6 is formed by a layer of transparent conductive material such as ITO or any other transparent conducting material. Also a conductive organic material known in the art have lower hydrophobic properties than the hyrophobic first interface surface 10 can be used. The second electrode layer 6 must contact the polar liquid 29 in the electrowetting element 1, but does not necessarily be a contiguous layer as shown in FIG. 1. It is sufficient if it covers at least a part of the containment space 25.

The first and second electrode layer 6, 13 together allow the electrowetting element 1 to be powered on and off by applying an appropriate voltage to them.

The superstrate layer 7 and substrate layer 11 may be formed by any suitable material. These layers will often be formed by a transparent glass layer, and dependent on whether the electrowetting optical cell is of the transparent type or reflective type, the substrate layer 11 may be formed by a non-transparent layer as well. Alternatively, superstrate layer 7 and substrate layer 11 may be formed from a rigid or flexible polymer material such as polyethersulfone (PES), polyimide (PI), polythiophene (PT), phenol novolac (PN), or polycarbonate (PC).

The optionally reflective layer 14 allows the electrowetting element to be used in a reflective manner having light incident on the superstrate side or the side of the second electrode layer stack 5 of the element 1 being reflected by the reflecting layer 14 and exiting again through the second electrode layer stack 5 side. The reflective layer 14 can be made from a metal such as aluminium, deposited on the substrate 11. In reflective type electrowetting elements, the reflective layer 14 may also act as first electrode layer.

The electrically isolating layer 12 can be formed of for example silicon dioxide or aluminum oxide or any other suitable material which prevents a short circuit in applying the electrical voltage and allows an electrical field to build up such that the polar liquid is attracted to the first electrode layer 13, driving the non-polar liquid aside.

Preferably, the hydrophobic interface surface 10 exhibits a small contact angle hysteresis for improving the switchability of the optical cell, i.e. enabling smooth opening and closing of the cell upon switching in the powered up and powered off state.

Pixel walls 19 are fixedly mounted on the less hydrophobic or hydrophilic surface of the second electrode layer 6. As a result of the mounting of the pixel walls 19 on the second electrode layer, and due to the physical properties of the less hydrophobic surface, a strong mechanical connection between the pixel walls 19 and the hydrophilic surface interface 6 is achieved. This results in a good structural integrity of the pixel walls as mounted on the second electrode layer stack 5.

The pixel walls 19, and the first and second electrode layer stacks 3 and 5 respectively, define the containment space 25 of the electrowetting optical cell 1. The containment space 25 is filled with a polar liquid 29 and a non-polar liquid 30. The polar liquid 29 and non-polar liquid 30 are immiscible with each other. In addition, the polar liquid 29 is formed of a substance having molecules with non-zero chemical polarity. The non-polar liquid is formed of a substance having molecules with negligible or very small chemical polarity. As a result, switching of the electrodes in the powered up and powered off state modifies the balance of forces between the non-polar liquid and the polar liquid and the hydrophobic surface, causing these liquids to rearrange suitably for opening and closing the electrowetting optical cell.

The pixel walls 19 can be dimensioned such that they span the distance between the second electrode layer stack 5 and the first electrode layer stack 3. This way, the pixel walls 19 prevent spreading of the non-polar liquid 30 to adjacent electrowetting elements. The pixel walls 19 are optionally provided with hydrophobic surfaces 21 such that the non-polar liquid 30 will stay contiguous to the pixel walls more easily than the polar-liquid, which is repelled by the hydrophobe surface of the pixel walls 19.

The pixel walls 19 comprise end faces 34 opposite the hydrophobic surface 10 of the first electrode layer 3. In FIG. 1 a small slit 32 is shown in between the end faces 34 and the hydrophobic surface layer 10 of the first electrode layer 12. This enables the non-polar liquid 30 to entrain the slits 32, and to form a small interface 24 on the other side of the slit near the edge of the pixel walls 19 resulting from capillary action within the slit 32. An effect of the small capillary interface is that it greatly reduces the amount of light scattering caused by the pixel walls 19 in the electrowetting optical cell 1.

To further improve the entrainment of the non-polar liquid into the slit, the end faces 34 of the pixel walls 19 may be provided with a hydrophobic surface 35 thus enabling the non-polar liquid 30 to more easily be entrained into slit 32 in the powered state of the electrowetting element and easy return of the non-polar liquid onto the hydrophobic interface surface 10 of the first electrode layer stack 3.

Figure 2A:
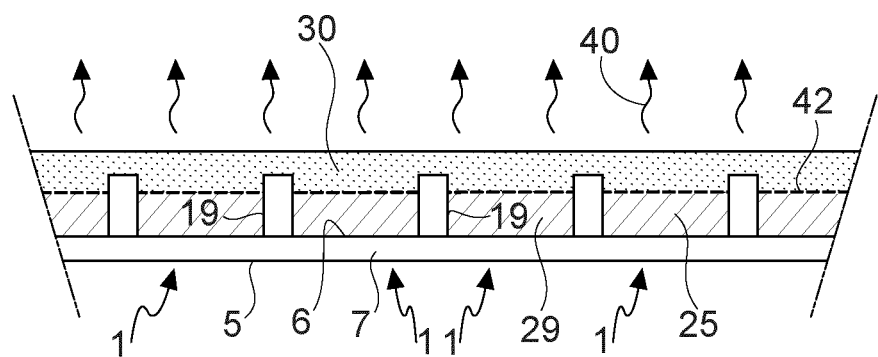
FIG. 2a-2c illustrate various method steps of the method for manufacturing of electrowetting optical element in accordance with the present invention.
Figure 2B:
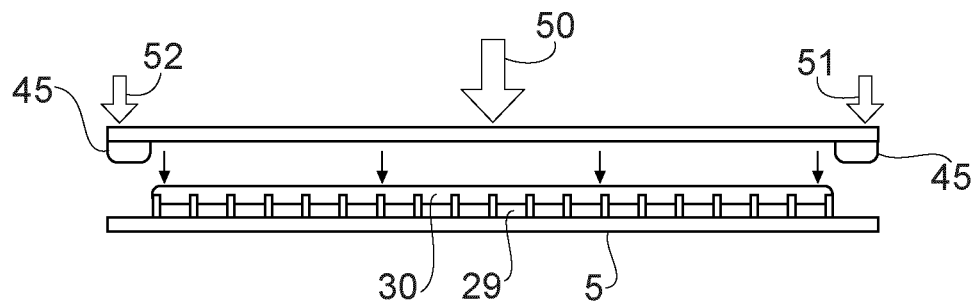
Figure 2C:
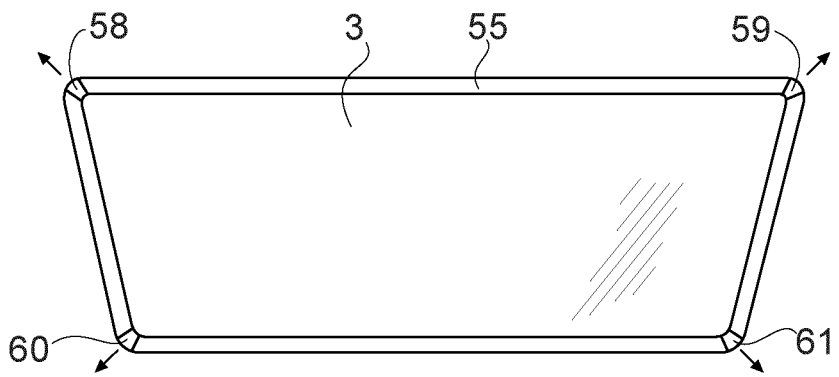
Figure 3:
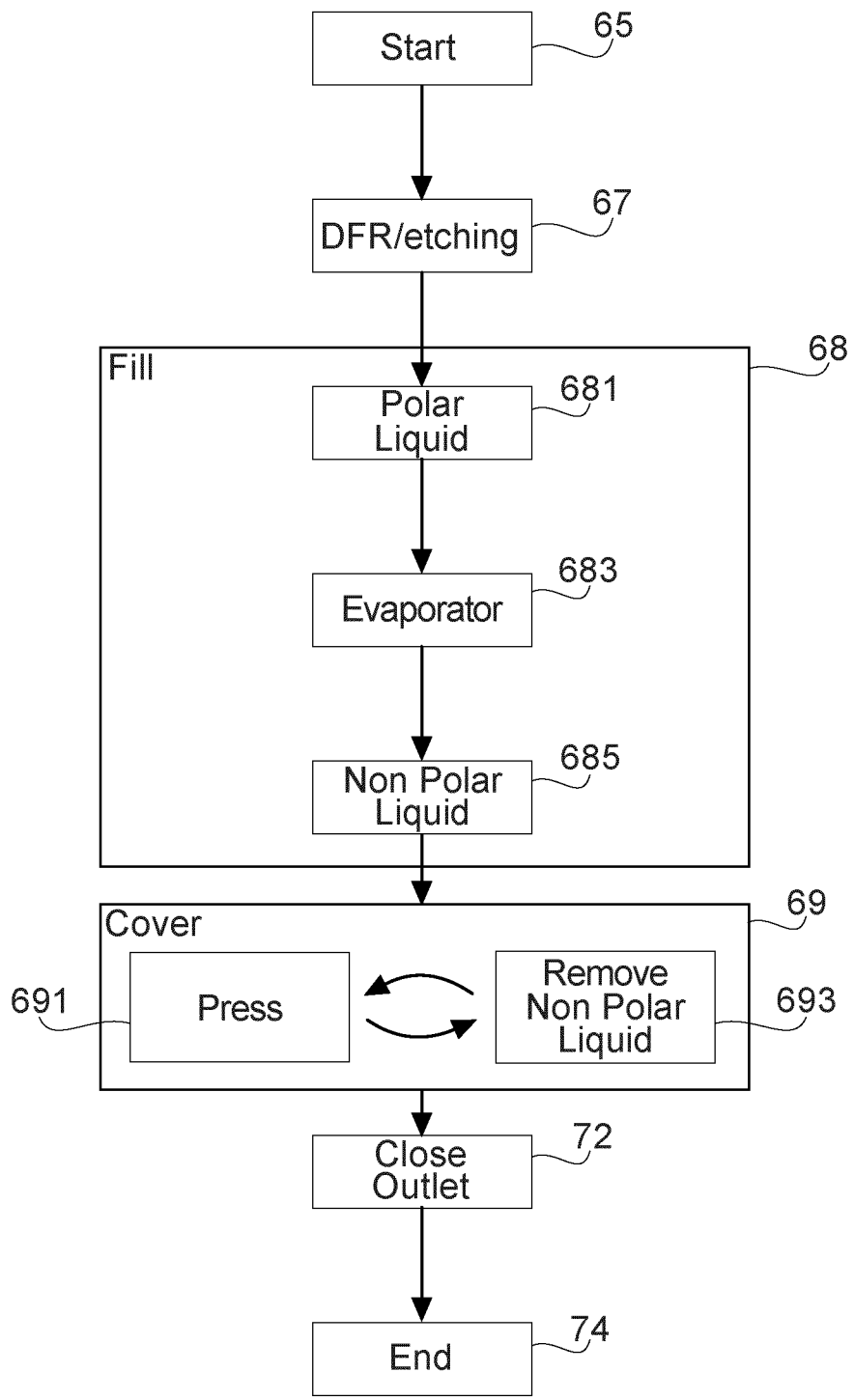
FIG. 3 schematically illustrates a method of the present invention.

In FIG. 2*a-c*, various method steps of a method of manufacturing an electrowetting element in accordance with the invention are illustrated. FIG. 3 provides a schematic overview of such a method. A reference will now be made to FIGS. 3 and 2*a-c* for explaining the methods of the present invention.

In step 65 of the method illustrated in FIG. 3, a manufacturing method is started by providing a second electrode layer stack 5 comprised of a substrate layer 7 and a second electrode layer 6 having a less hydrophobic surface. The second electrode layer 6 may be provided by a suitable coating, e.g. ITO in view of its optical and electrical properties, which can be made less hydrophobic or hydrophilic using a plasma processing technique with a oxygen (O2) processing gas.

In step 67, pixel walls 19 are mounted on the less hydrophobic surface 6 of the second electrode layer stack 5 using a suitable technique such as dry film resist lithography (DFR) wherein a photoresist layer is deposited on the hydrophilic surface of layer 6 and which is etched leaving only the pixel walls 19 as a consequence. The pixel walls 19 are created such that they are fixedly mounted on the less hydrophobic surface of the second electrode layer 6.

Additionally plasma processing of the second electrode layer stack 5 with the pixel walls 19 using a processing gas comprising CF4 can be performed. This renders the pixel walls 19 to be hydrophobic. This is preferably performed only to the end face 34 of the pixel wall 19, prior to etching of the pixel walls, enabling the non-polar liquid to be entrained into the slits 32 to be formed when completing the manufacturing of the electrowetting element.

After the pixel walls 19 are formed in step 67, the containment spaces 25 formed on the second electrode layer stack 5 are filled in step 68 with a suitable polar liquid 29 and a non-polar liquid 30. Step 68 consists, in the present embodiment, of three separate steps 681, 683 and 685. In step 681, the containment spaces formed by means of the pixel walls 19 are filled with the polar liquid 29. Often, the polar liquid 29 will primarily comprise water and/or more soluble organic substances such as glycol and/or methanol.

In step 683, part of the polar liquid 29 is evaporated. Since evaporation takes place equally across the full surface of the polar liquid, after evaporation, the level at which the containment spaces between the pixel walls 19 on the second surface are filled is equal across the surface. Evaporation can be improved by the addition of methanol in the polar liquid 29, which will evaporate more readily than other solvents in the mixture, such that the overall level of the polar liquid 29 will be reduced by a certain amount, for example approximately 25%, after evaporation (the methanol being no longer present in the polar liquid 29).

In FIG. 2*a*, the step of evaporation of the polar liquid is illustrated. FIG. 2*a* shows the second electrode layer stack 5 comprising the superstrate layer 7 and the second electrode layer 6 having the less hydrophobic surface. The step 681 of filling is performed by filling the containment spaces 25 completely and increasing the level of the polar liquid 29 to a level above the height of the pixel walls 19. Then, evaporation 683 takes place as schematically illustrated by the arrows 40 above the surface of the polar liquid 29. The level of the polar liquid 29 thereby decreases equally across the surface, to a predetermined level which is schematically illustrated by dotted lines 42. As can be seen, in each containment space 25 of the electrowetting element 1 the level of the polar liquid after evaporation is equal Subsequently in step 685, the non-polar liquid 30 is added to the containment spaces of the second electrode surface 5. Alternatively, the non-polar liquid 30 may also be added to the surface of the first electrode layer 3, simply by allowing an amount of non-polar liquid 30 to spread across the surface 10 of the first electrode layer stack 3.

After step 685 of filling step 68, the electrowetting element 1 is to be covered with the first electrode layer stack 3 in step 69. Step 69 is illustrated in FIG. 2*b*. In the presently described method it is assumed that the non-polar liquid 30 is already filled to a level above the pixel walls of the second electrode layer stack 5, as illustrated in FIG. 2*b*. A frame 45 running across the sides of the second electrode layer stack 5, and comprising an amount of glue or an adhesive substance, allows the first electrode layer stack 3 to be mounted firmly on top of the second electrode layer stack 5, closing the containment spaces.

Step 69 of covering the second electrode layer stack 5 with the first electrode layer stack 3, comprises the step of pressing the first electrode layer stack 3 slowly on top of the second electrode layer stack 5 (step 691), and simultaneously allowing the excess non-polar liquid 30 to be removed from the containment spaces 25 in step 693. This is done by exerting a force primarily on to the mid portion of the first electrode layer stack 3. The forces 51 and 52 on the sides of the first electrode layer stack 3 may be smaller than the force 50 exerted on the mid portion of the first electrode layer stack 3 such as to slightly deform the first electrode layer stack 3 allowing the mid portion of the first electrode layer stack 3 to touch the end faces 34 of the pixel walls 19 on the second electrode layer stack 5 earlier than on the sides and edges of the first electrode layer. The excess non-polar liquid 30 in the containment spaces 25 is thereby forced outward to the periphery of the second electrode layer stack 5 where it is removed by step 693.

In order to allow the excess non-polar liquid 30 to be removed from the second electrode layer stack 5, as illustrated in FIG. 2*c*, a frame 55 of the second electrode layer stack 5 surrounding the electrowetting elements 1 comprises channels 58, 59, 60 and 61 in the corners thereof. When the non-polar liquid 30 is pressed outwards towards the periphery of the second electrode layer stack 5, it will be pressed through the channels 58-61 formed in the frame 55 prior to fixing the first electrode layer stack 3 to the second electrode layer stack 5.

Subsequently, in step 72, the outlets 58-61 in the frame of the electrowetting elements 1 formed are closed by a suitable substance, such as a resin. The electrowetting element 1 according to the present invention is then ready for further processing dependent on the application, and the manufacturing method is ended in step 74.

As will be appreciated by the person skilled in the art, the present invention may be practiced otherwise than as specifically described herein. Obvious modifications to the embodiments disclosed, and specific design choices, will be apparent to the skilled reader. The scope of the invention is only defined by the appended claims.

The invention claimed is:

1. Electrowetting optical element comprising
    a first electrode layer stack and a second electrode layer stack, and
    a containment space formed between said first electrode layer stack and said second electrode layer stack,
    one or more pixel walls extending between said first and second electrode stacks for defining sides of said containment space,
    said containment space at least containing a polar liquid and a non-polar liquid, the polar and non-polar liquids being immiscible with each other,
    said first electrode layer stack comprising
        a substrate,
        a first electrode layer and
        an insulating layer having a hydrophobic first interface surface with said containment space, and
    said second electrode layer stack comprising a superstrate and a second electrode layer having a second interface surface with said containment space,
    said hydrophobic first interface surface having a higher hydrophobicity then said second interface surface, and
    said electrowetting optical element being arranged for enabling powering of said first and second electrode layers for rearranging said polar liquid relative to said non-polar liquid,
    wherein said pixel walls being fixedly mounted on said second interface surface of said second electrode layer stack and extending towards said first electrode layer,
    wherein an end face of said one or more pixel walls opposite said first electrode layer stack faces said hydrophobic first interface surface in a loose manner,
    said one or more pixel walls comprise a further hydrophobic surface formed on said the end face of said pixel walls opposite said first electrode layer.

2. Electrowetting optical element according to claim 1, wherein a slit is present in between said end face and said hydrophobic first interface surface for entrainment of said non-polar liquid into said slit.

3. Electrowetting display comprising one or more electrowetting optical elements in accordance with claim 1.

* * * * *